United States Patent
Gan et al.

(10) Patent No.: US 9,079,622 B2
(45) Date of Patent: Jul. 14, 2015

(54) GAP FAIRING FOR A TRACTOR-TRAILER

(71) Applicants: Yanan Gan, Tonawanda, NY (US);
Gregory W. Henzler, E. Amherst, NY (US); John Vogel, Columbus, IN (US); Ryan Anthony Reeder, Carmel, IN (US)

(72) Inventors: Yanan Gan, Tonawanda, NY (US);
Gregory W. Henzler, E. Amherst, NY (US); John Vogel, Columbus, IN (US); Ryan Anthony Reeder, Carmel, IN (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 14/317,659

(22) Filed: Jun. 27, 2014

(65) Prior Publication Data

US 2014/0319871 A1    Oct. 30, 2014

Related U.S. Application Data

(63) Continuation-in-part of application No. 13/938,661, filed on Jul. 10, 2013, now Pat. No. 8,801,077, which is a continuation-in-part of application No. 13/561,829, filed on Jul. 30, 2012, now Pat. No. 8,506,004.

(51) Int. Cl.
    *B62D 35/00* (2006.01)
(52) U.S. Cl.
    CPC .................................. *B62D 35/001* (2013.01)
(58) Field of Classification Search
    CPC ................................................... B62D 35/001

USPC ............................................ 296/180.1, 180.2
IPC ...................................................... B62D 35/00
See application file for complete search history.

(56) References Cited

U.S. PATENT DOCUMENTS

| | | | |
|---|---|---|---|
| 3,834,752 A | 9/1974 | Cook et al. | |
| 4,121,684 A | 10/1978 | Stephens et al. | |
| 4,397,496 A * | 8/1983 | Drygas, III | 180/14.1 |
| 4,848,832 A | 7/1989 | Starnes | |
| 4,904,015 A | 2/1990 | Haines | |
| 4,925,235 A * | 5/1990 | Fingerle | 296/180.2 |
| 5,516,185 A | 5/1996 | O'Donnell et al. | |
| 5,836,640 A * | 11/1998 | Hurayt et al. | 296/180.2 |
| 2011/0068602 A1* | 3/2011 | Burrows | 296/180.1 |
| 2011/0109121 A1 | 5/2011 | Salari et al. | |
| 2012/0126573 A1 | 5/2012 | Minbiole | |

FOREIGN PATENT DOCUMENTS

DE     29 51 982 A1     7/1981

\* cited by examiner

*Primary Examiner* — Pinel Romain
(74) *Attorney, Agent, or Firm* — Robert J. Hampsch

(57) ABSTRACT

A gap fairing for a tractor-trailer is provided. A fairing body with an impact absorbing extension is attached to a chassis of the tractor, independently of the cab thereof and within a gap between a cab of the tractor and the trailer. The fairing body has side portions, extending rearwardly from a front portion, adjacent the cab of the tractor, toward the trailer and top portion. A clear panel can be located in at least the side portion of the fairing body located at the passenger side to enable the driver to view the trailer through the rear window of the tractor and the clear panel. A separation space between the front of the fairing body and the cab can be sealed by a sealing element that is at least in part one of resilient and flexible so as to allow relative motion between the fairing body and the cab.

18 Claims, 12 Drawing Sheets

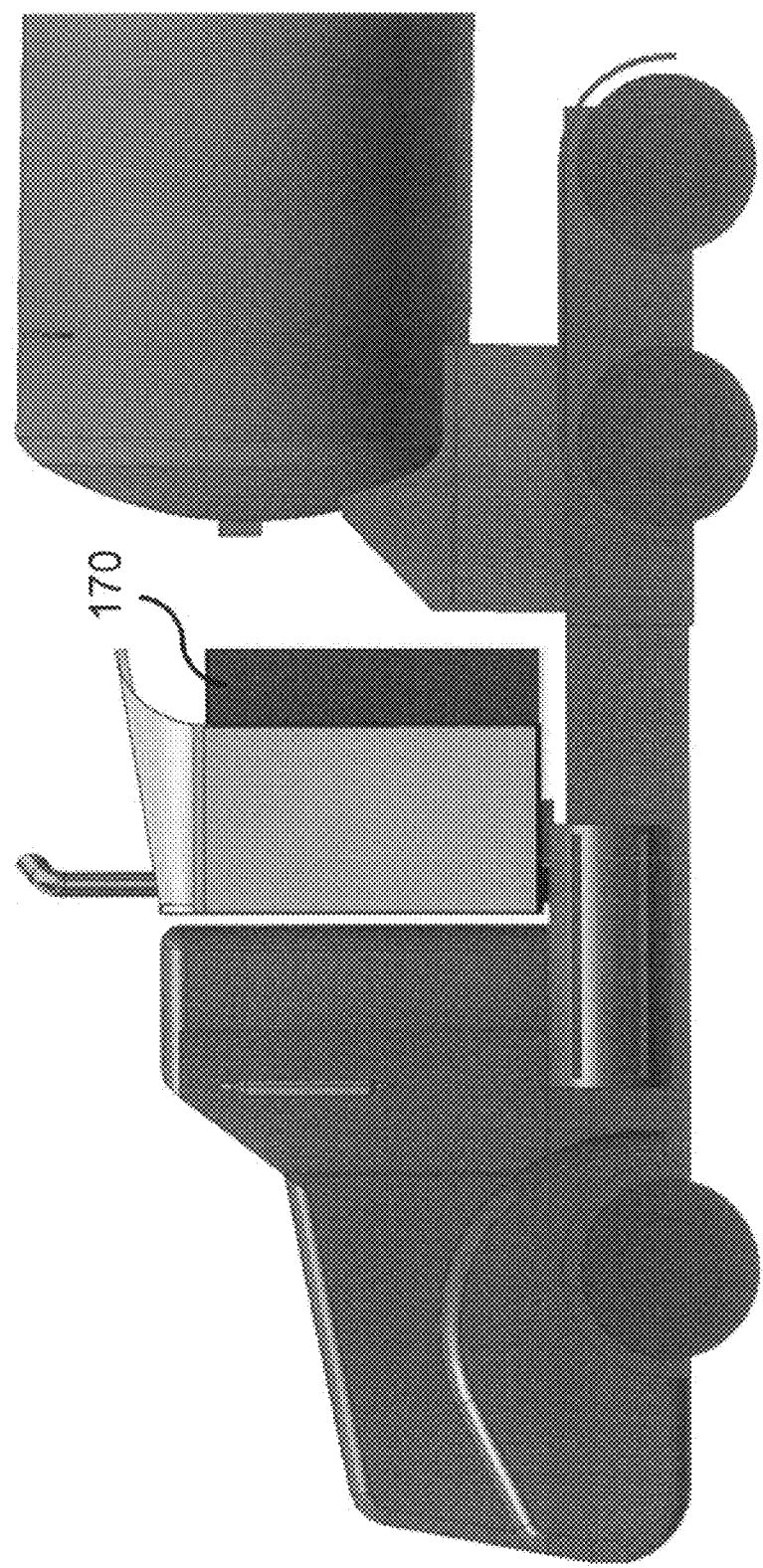

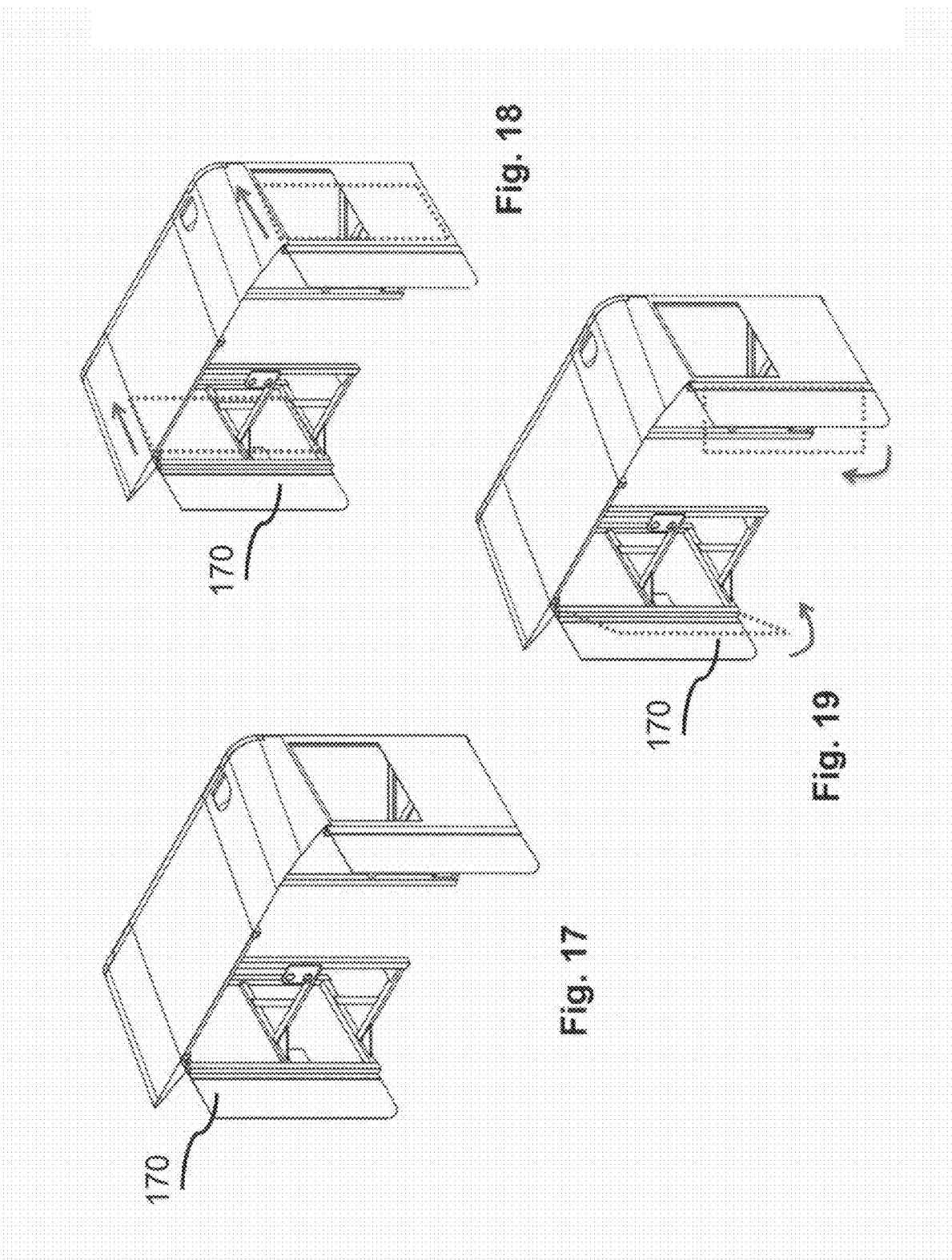

GAP FAIRING FOR A TRACTOR-TRAILER

RELATED APPLICATIONS

This application is a continuation-in-part of, and claims priority from, U.S. patent application Ser. No. 13/938,661 filed Jul. 10, 2013 which is a continuation-in-part application of U.S. patent application Ser. No. 13/561,829 filed Jul. 30, 2012.

FIELD OF THE INVENTION

The present invention relates to a gap fairing for a tractor-trailer in which the gap fairing is mounted in a gap between the tractor and the trailer to reduce aerodynamic drag induced by cross winds that would otherwise enter the gap and to increase streamlining of air flow from a cab of the tractor to the trailer. More particularly, the present invention relates to such a gap fairing with a body portion and a impact absorbing extension in which the body portion of the gap fairing is mounted to the chassis of the tractor independently of the cab, and the impact absorbing extension is a rearward extending structure that protects the body portion from impact by the trailer during maneuvering of the tractor-trailer.

BACKGROUND

Tractor-trailers are used for over the road transport of goods and other products. Typically, the trailer is pivotably connected to the tractor so that the combination can be maneuvered and with a spacing or "gap" between the tractor cab and the trailer. This gap is a particular source of drag for all tractor-trailers of all cross sectional shapes, including cylindrical tankers such as are used in the industrial gas bulk distribution business, the oil industry and etc.

Aerodynamic drag is a major contributor to fuel consumption, especially at speeds above 50 MPH. Aerodynamic improvements can contribute to fuel savings and provide cost reduction. Fuel consumption reduction also greatly enhances carbon footprint reduction and helps meet additional environmental quality standards and objectives. The gap described above adversely and significantly affects fuel economy. As will be discussed, reducing the size of this gap results in a reduction in fuel consumption of about seven percent.

Tractor-trailers in which a tank is mounted on the trailer are a particular type of bluff body vehicle known to have high drag coefficients. Aerodynamic drag in the gap area is known to be a function of the sub-optimal flow transition from the size and shape of the tractor cab and that of the trailer. The tanker trailer often has a frontal area with air impingement not otherwise deflected by the tractor cab. Also, with the nearly inevitable presence of side wind vectors, the enlarged gap due to the configuration of the tanker trailers allows entry of cross winds and associated forces which also act on the frontal face of the trailer. This resulting flow separation further contributes to increased aerodynamic drag and increased fuel consumption.

Where tractor-trailers are used for transport of liquefied atmospheric gases, these tankers often depart an air separation plant with the maximum over-the-road limited weight. This necessitates adjustments to the effective wheelbase for load distribution among the axles. This required redistribution of the weight tends to require further lengthening of the gap which in turn, additionally increases the aerodynamic drag in that spatial arrangement.

The reduction of drag by enclosing the gap between tractor and trailer with a gap fairing has been recognized in the prior art. In this regard, an example of a current commercially available gap fairing is described in U.S. Pat. No. 3,834,752 which discloses a gap fairing that is sized for the common range of gap distances, from the back plane of the tractor cab to the front plane and arc of swing of the box or van trailers, where the gap distance is markedly shorter than on fully loaded tanker trailers. More recently a gap fairing on an industrial gas bulk liquid delivery tanker has been introduced. This tractor included a "cab-over configuration", still typically used in the United Kingdom and Europe but obsolete in the United States. The gap fairing for this recent design does not include an extended back portion required to optimally achieve maximum gap coverage. The gap fairing is attached to the tractor cab, resulting in the transmission of intended and possibly unintended loads into the very thin tractor cab surface necessitating supplemental structural enhancement. This particular fairing design would require significant modification, tooling, and fitting changes for use with a multitude of tractor sizes, shapes and materials of construction variability.

US Patent Application No. 2011/0109121 discloses a gap fairing that can be used in connection with tractor-trailers having a tank that addresses the size and shape transition, from rectangular cab to cylindrical trailer, as well as consideration of the necessary spacing for tractor-trailer articulation during backing maneuvers. The fairing configuration attaches to the tractor cab, with the attendant imposition of loads on the cab surface and/or structure. This idealized shape, however, has been found by the inventors to represent a costly manufacturing challenge. In addition, the highly conformal fairing-to-cab interface would require significant changes to the design and tooling for a range of tractors with sizes, shapes or materials of construction variations.

A problem common to all fairings that are located behind the tractor cab, is that they block visibility to the passenger side of the tractor. This can be a problem during maneuvering of the tractor trailer, particularly when the tractor trailer is being backed into a facility. The reason for this is that the driver's view of the trailer, particularly when the trailer is angled toward the tractor at the passenger side is blocked by the fairing.

As will be discussed the present invention provides a gap fairing for a tractor-trailer and the use of such a gap fairing in reducing drag. Among other advantages of a gap fairing in accordance with the present invention is that such gap fairing is attached directly to the tractor chassis independently of the cab, can be easily adapted for a variety of tractor-trailer designs and can be fabricated in a less expensive manner than gap fairings of the prior art and further, is provided with a clear panel to facilitate maneuvering of the tractor trailer.

SUMMARY OF THE INVENTION

The present invention may be characterized as a gap fairing for reducing aerodynamic drag of a tractor-trailer having a tractor and a trailer pivotably connected to the tractor. The gap fairing comprises a fairing body attached to a chassis of the tractor within the gap between a cab of said tractor and a trailer of said tractor-trailer and configured to enable the trailer to pivot during maneuvering of the tractor-trailer. The fairing body has a front portion, a top portion, side portions and one or more impact absorbing extensions extending rearwardly from the side portions of the fairing body.

The one or more impact absorbing extensions extending rearwardly from the side portions of the fairing body protect the fairing body and the trailer from any impact between the fairing body and the trailer during maneuvering of the tractor-trailer. The impact absorbing extensions and the side portions are configured to inhibit cross-winds from entering the gap and streamline air flow from sides of the cab to the trailer. The impact absorbing extensions are preferably constructed from a flexible, compressible or resilient type material, such as an elastomeric material, that provides a physical barrier between the side portion of the fairing body and the trailer. In some embodiments of the present gap fairing, the impact absorbing extension is a moveable structure that retracts into the side portion upon impact from the trailer while providing a physical barrier between the side portion of the fairing body and the trailer. Other embodiments use an impact absorbing extension that is hinged to the side portion and rotates upon impact from the trailer while maintaining a physical barrier between the fairing body and trailer.

The front portion of the fairing body is situated directly behind the cab and a separation space exists between a front portion of the fairing body and the cab. The side portions extend rearwardly from the front portion toward the trailer thereby inhibiting cross-winds from entering the gap and assisting in streamlining air flow from sides of the cab to the trailer. In some embodiments, the top portion is connected to at least the front portion and extends to the side portions. The top portion is preferably upwardly sloping from the front portion of the fairing body and terminating in a trailing end located behind the side portions. The side portions can be generally parallel to one another or can converge toward one another.

The fairing body optionally includes at least one clear section in one of the side portions, preferably located on a passenger side of the tractor. This clear section is positioned to enable a driver of the tractor to view the trailer from a rear window of the cab when the trailer is angled with respect to the tractor.

In some embodiments of the gap fairing there is a seal element disposed between the cab and the fairing body and adapted to seal the separation space between said cab and the fairing body at outer peripheral portions thereof. The seal elements have resiliency and flexibility so as to allow relative motion between the fairing body and the cab.

The present invention may also be characterized as an impact absorbing member for a tractor-trailer combination comprising a panel structure moveably or fixedly coupled to a fairing body or a cab of the tractor-trailer combination, the panel structure having a leading edge disposed proximate to the fairing body or the cab of the tractor-trailer combination and a trailing edge extending readwardly from the fairing body or the cab towards a trailer. The impact absorbing member is configured to provide a barrier between the fairing body or the cab and the trailer during maneuvering of the tractor-trailer. The impact absorbing member is further configured to assist in inhibiting cross-winds from entering the gap between the tractor and the trailer and streamline air flow from the tractor to the trailer.

BRIEF DESCRIPTION OF THE DRAWINGS

The accompanying drawings, which are incorporated into and form a part of the disclosure, are as follows:

FIG. 16 is a partial side elevational view of the tractor-trailer arrangement incorporating a gap fairing in accordance with the present invention;

FIG. 17 is a perspective view of an embodiment of the fairing body and impact absorbing extensions in accordance with the present invention;

FIG. 18 is a perspective view of another embodiment of the fairing body and impact absorbing extensions in accordance with the present invention; and FIG. 19 is a perspective view of yet another embodiment of the fairing body and impact absorbing extensions in accordance with the present invention.

DETAILED DESCRIPTION

Figure 1:
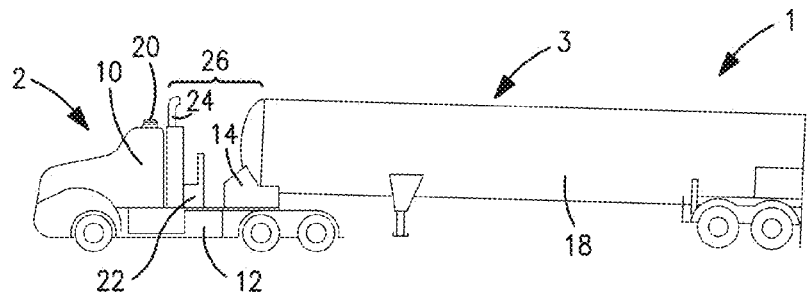
FIG. 1 is a side elevational view of a conventional tractor-trailer without a gap fairing.

With reference to FIG. 1, a conventional tractor-trailer 1 is illustrated that does not include gap fairing in accordance with the present invention. Tractor-trailer 1 has a tractor 2 having a cab 10 mounted on a chassis 12 which contains the engine for the tractor and a cockpit for drivers and passengers. Mounted towards the rear portion of the chassis 12 of the tractor 2 is a king-pin pivot 14 which pivotably connects the trailer 3 to the tractor 2 to allow the tractor-trailer 1 to be maneuvered and turned. The trailer 3 is of the type that mounts a cylindrical tank 18 that can be of circular or oval cross-section to contain liquid products of various types. In addition, the cab 10 includes a GPS antenna dome arrangement 20 as well as an auxiliary hydraulic unit and associated frame 22. An exhaust pipe 24 discharges combustion gases from the tractor engine in a manner such that the fumes are elevated above normal road vehicles traveling near or behind the tractor-trailer 1.

A substantial gap 26 is formed between the cab 10 and the trailer 3. As mentioned above, such gap 26 results in aerodynamic drag being imparted to the tractor-trailer 1 when traveling at highway speed from cross-winds entering the gap. Additionally, there is a geometric mismatch between the rectangular transverse profile of the cab 10 and the cylindrical or oval tank 18 which also will induce aerodynamic drag. The total of such drag on the tractor-trailer 1 results in a decrease in gas mileage and therefore, an increased cost to the fleet operator.

It is to be noted that although trailer 3 is of the type that mounts a cylindrical tank 18; and the invention has been described in connection with such a trailer, this is for exemplary purposes only. The present invention would have equal application to a tractor-trailer incorporating any type of trailer, for example, a van trailer or a dump trailer.

Figure 2:
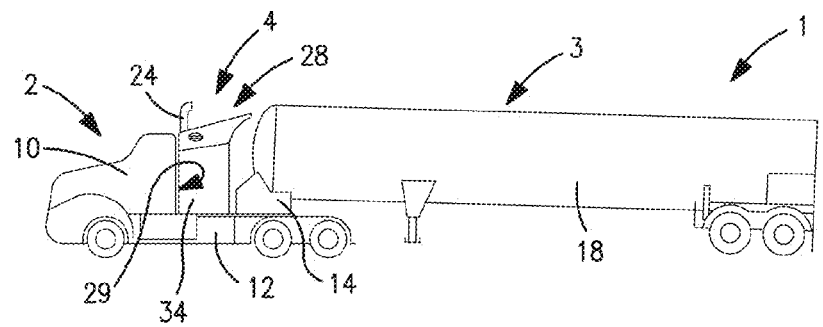
FIG. 2 is a side elevational view of the tractor-trailer incorporating a gap fairing incorporating some of the features of the present invention.
Figure 3:
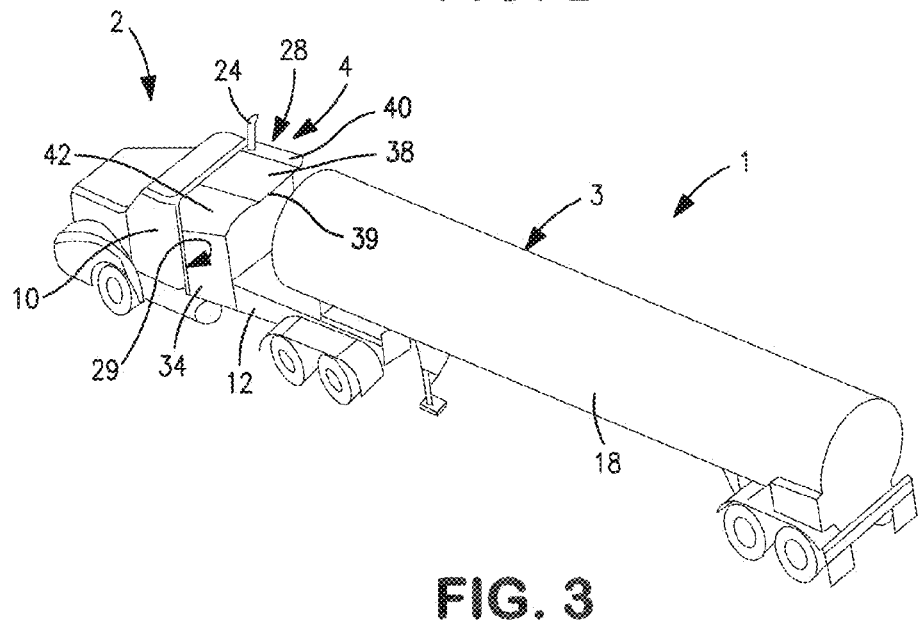
FIG. 3 is a perspective view of the tractor-trailer with gap fairing of FIG. 2.

With reference to FIGS. 2 and 3, tractor-trailer 1 is illustrated incorporating a gap fairing 4 in accordance with the present invention. Gap fairing 4 includes a fairing body 28 connected to the chassis 12 and preferably, a gap seal element 29 to seal a separation space 120, illustrated hereinafter in FIGS. 12-14, between the fairing body 28 and the cab 10. The fairing body 28 is located within the gap 26 to help inhibit the effect of cross-winds and to provide a degree of streamlining that will reduce aerodynamic drag due to geometric mismatch between the cab 10 and the tank 18 and a height mismatch due to the fact that the top of front portion 19 of tank 18 is located at a higher elevation than the top of cab 18. Preferably, as will be discussed below, the fairing body 28 is designed such that the GPS antenna dome arrangement 20 is located within the fairing body 28 and the exhaust pipe 24 extends through fairing body 28 in a unimpeded manner. Openings could be provided on both sides of the fairing body 28 depending on the tractor exhaust configuration.

Figure 4:
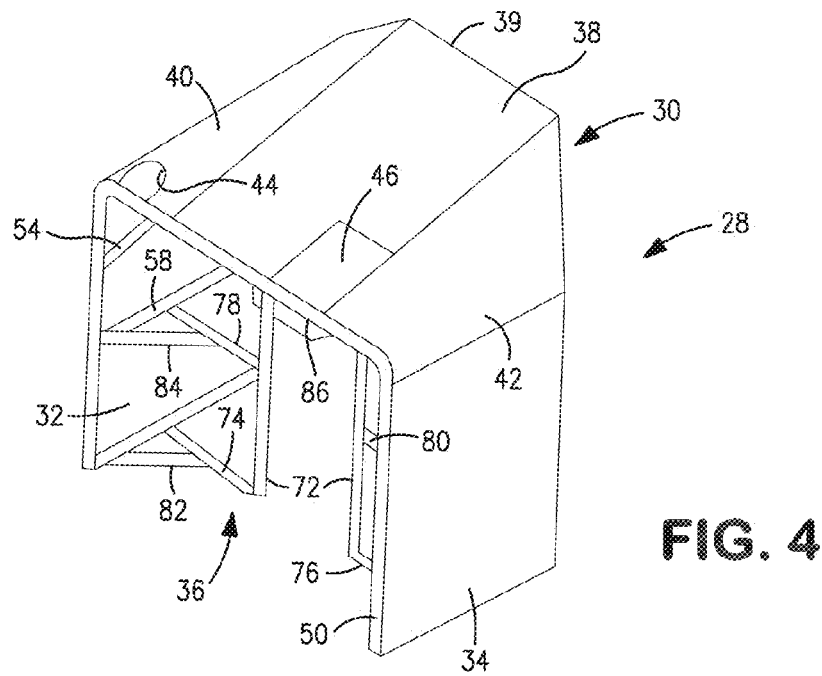
FIG. 4 is a perspective view of a fairing body in accordance with the present invention.

With additional reference to FIG. 4, fairing body 28 has a front portion or leading end formed by a front member 50 of a the frame 36 to be discussed hereinafter that preferably has a cross-sectional size and shape that essentially matches that of the rear portion of the cab 10. Extending rearwardly of the front portion is a top portion 30 and two opposed side portions 32 and 34 that are formed of panels or other covering that are supported by the frame 36. With brief reference to FIG. 3, the back of the fairing body 28 is open, which permits visual inspection, access, illumination, minimized weight, and ventilation including that required for an auxiliary hydraulic unit 22 and the engine exhaust pipe 24. This being said, embodiments of the present invention are possible in which the back of the fairing body 28 is partially or completely closed for such purposes as stiffening of the fairing body 28, aerodynamic improvement, impeding and/or controlling access to the space underneath the fairing body 28. Although not illustrated, the surfaces or trailing end of the fairing body 28 could be provided with supplemental aerodynamic features including; vanes, fins, guides, channels, spoilers or other features to further optimize airflow and minimize aerodynamic drag by providing streamlining capabilities. Moreover, also as not illustrated, hand holds, steps, tie-offs or other features can be incorporated or added to the fairing body 28 enhance accessibility or to provide protection of items transported on the tractor-trailer.

The top portion 30 has a wedge-like roof section 38 that is upwardly inclined from the front of the fairing body 28 and a pair of transition sections 40 and 42 that extend from the wedge-like roof section 38 toward the opposed side portions 32 and 34. The panel forming the transition section 40 is provided with an opening 44 for the exhaust pipe 24 which thereby extends through the firing body 28. The wedge-like roof section 38 is provided with a window 46 formed of fiberglass or other material that allows for transmission of GPS signals to the GPS antenna 20 that is housed within the fairing body 28 and supported by a tray 86 to be discussed. The wedge-like roof section 38 is upwardly inclined from the roof of the cab 10, at or about the height of the cab 10, to a level, at or near the height of the top of the cylindrical tank 18. Preferably the inclination of the wedge-like roof section from the horizontal plane is in a range of at least 5 degrees and preferably no greater than 30 degrees. It is to be noted that the wedge-like roof section 38 presents a planar surface to the air flowing from the cab 10 to the tank 18 to deflect the air over the top of the tank 18 at a front portion thereof. Preferably, the wedge-like roof section 38 extends behind the side portions 32 and 34. In this regard, the wedge-like roof section 38 terminates in a trailing edge 39 that is behind the rear edges of side portions 32 and 34. This extension of the wedge-like roof section allows for a more gradual slope for smooth air flow transition and greater closure of the gap 24, than would be possible without the extension, while maintaining the gap fairing side clearance allowing for at least a 90 degree articulation during back-up maneuvers of the tractor cab and cylindrical trailer combination. For example, if a possible embodiment of the present invention were made with an upwardly sloping roof section positioned at an intermediate location of the top portion 30 that was sized to deflect air over the tank 18, the slope would be more abrupt leading to more aerodynamic drag than the wedge-like roof section 38 due to higher profile drag and turbulence within the larger open area between the fairing body 28 and the tank 18.

While the wedge-like roof section 38 could incorporate a curvature in its upwardly sloping surface, the use of such a planar section has been found by the inventors herein not to significantly increase aerodynamic drag over such a curved section while at the same time can be manufactured more easily and less expensively than a curved design. Furthermore, it is important to note that the position of the wedge-like roof section 38, unlike the prior art, is not provided over the roof the cab, but instead is located behind the cab itself allowing for much lower costs in constructing the gap fairing 4 of the present invention. Moreover, the installation of the gap fairing 4 is far less expensive than prior art designs because, as will be discussed, the fairing body 28 is simply and more directly attached to the chassis 12.

Figure 5:
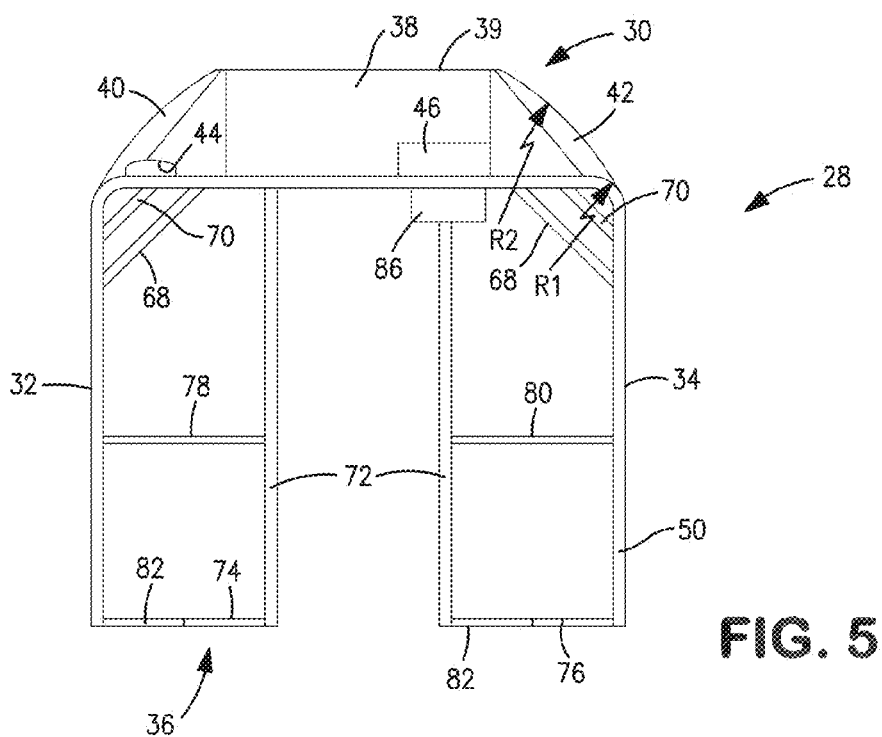
FIG. 5 is a front elevational view of the fairing body shown in FIG. 4.

As can best be seen from FIG. 5, each of the transition sections 40 and 42 preferably have a curved transverse configuration that at the front or leading end of the fairing body 28 has a radius "R1" that is smaller than the radius at the trailing end of the transition sections "R2" for streamlining purposes. Preferably, the radius "R1" can be selected to substantially match the radius between the roof and sides of the cab 10 as shown by "R1", and the radius "R2" can be selected to substantially match the radius of the tank 18 or similar tanks for a greater streamlining effect. Although the transition sections 40 and 42 could be formed of flat plates, the rounded radius configuration is preferred from the aspect of reducing aerodynamic drag by providing aerodynamically streamlined contoured sections that transition from the cab 10 to the tank 18. In this regard the top portion 30 could incorporate a curvature to mimic or approach the shape of the cylindrical tanker trailer. However this would add to the complexity of the fairing body 28 and therefore, the expense in manufacturing the same.

The two opposed side portions 32 and 34 extend from the transition sections 42 and 40, respectively, toward the bottom of the fairing body 28 or when installed, toward the chassis 12. The side surfaces formed by the side portions 32 and 34 are planar. The side portions 32 and 34 extend back as far as practical to minimize the gap 26, but not so far as to interfere with the trailer sides during articulation and backing maneuvers. During these maneuvers, the angle of articulation may exceed 90 degrees. Consideration is given for minimum clearances during combination of articulation and traverse of road irregularities which also affect the relative location of the tanker trailer and the fairing body 28.

Figure 15:
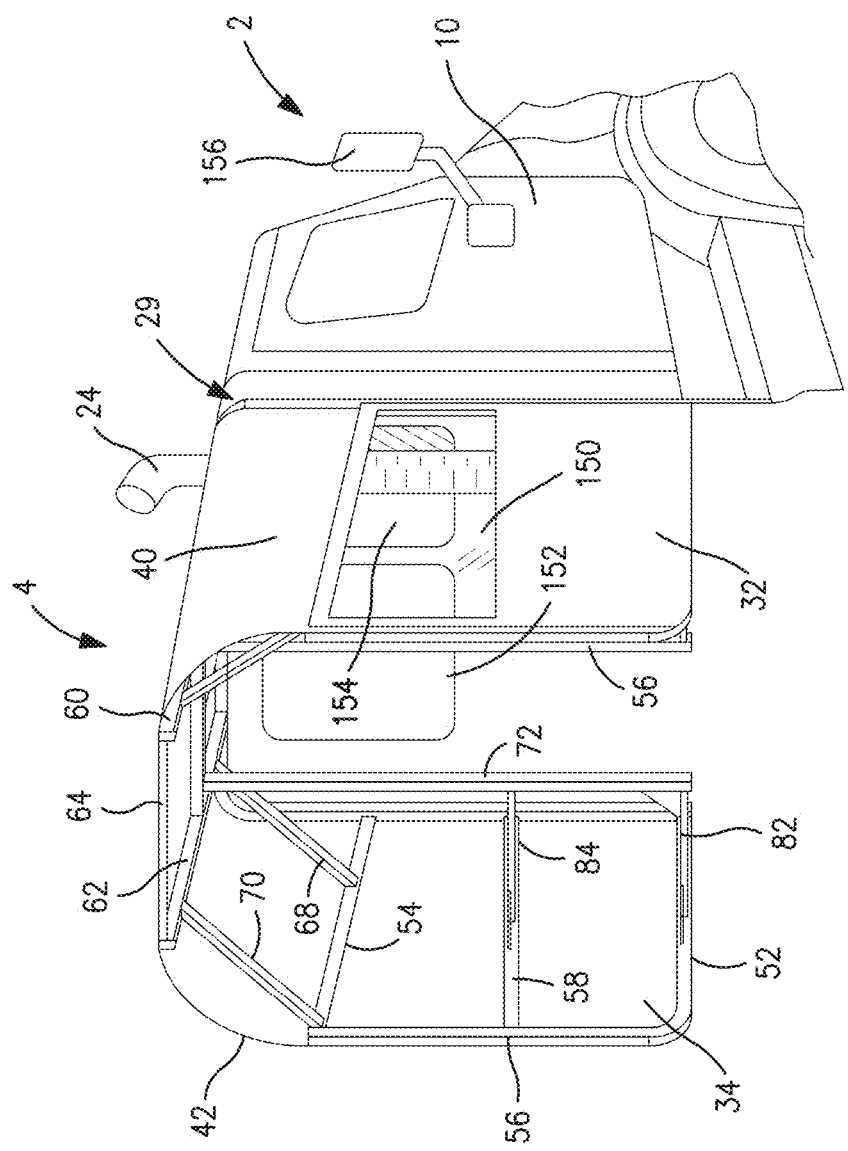
FIG. 15 is a rear fragmentary, perspective view of a gap fairing with portions of the tractor and the gap fairing removed to illustrate a clear panel used in enabling a driver to view the trailer on a passenger side of the tractor.

The design of the side portions 32 and 34 of the fairing body 28 can also be extended with resilient materials to accommodate contact with the tanker trailer during extreme articulation angles, yet provide the increased benefit of more complete gap elimination. The materials used for extension of the side portions or side panels can be elastomeric and flexible, bristles of a tightly formed brush, hinged rigid, or semi-rigid subsections. Portions or all of the side panels can be made optically transparent to reduce the visibility reduction associated with the gap fairing such as a clear side pane 150 incorporated into a side portion 32 as shown in FIG. 15 and as will be discussed in more detail, hereinafter. The side panels can either end at a level above the cab bottom or below the cab bottom. Any of the surfaces of the gap fairing can be equipped with fixed or actuated openings to dissipate air pressure from a gap fairing-equipped tractor being towed backwards.

The panels forming wedge-like roof section 38, the transition sections 40 and 42 and the side portions 32 and 34 are preferably formed from aluminum. Aluminum sheet formation is particularly advantageous for the transition sections 40 and 42 because such sections preferably incorporate a curvature and the formability of aluminum, or plastic alternatives, allows for smooth transition between this relatively small radius on the leading edge of the transition sections 40 and 42 and the larger radius at the rear of the transition sections 40 and 42. The inherent stability and stiffness of such curved sheets minimizes the need for additional structure, minimizing weight and cost. Other materials of construction could of course be used such as fiberglass or other fiber reinforced polymeric materials and thermoplastics and/or thermoplastic elastomers or other elastomers. In place of panels attached to a frame, the entire fairing body 28 could be integrally formed with an outer covering to provide the desired shape and strength, as with ribs or contoured sections to provide the structural contribution. Alternatively, in place of panel construction, flexible materials such as high performance fabric stretched taught over a framework are possible.

Figure 6:
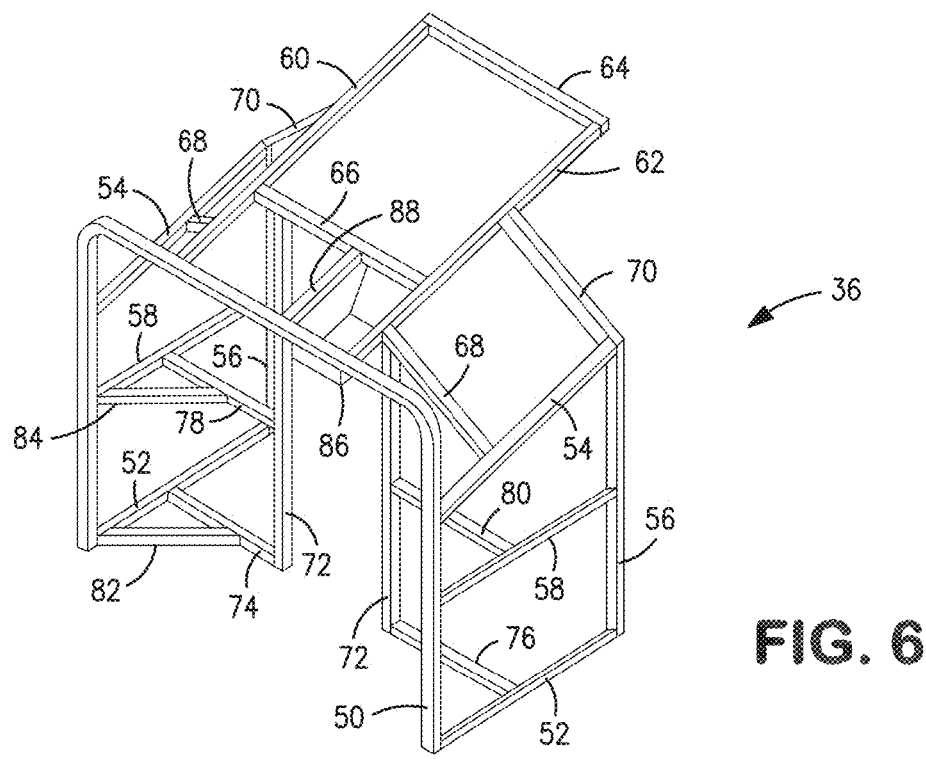
FIG. 6 is a perspective view of a frame of fairing body in FIGS. 4 and 5.

With reference to FIG. 6, the frame 36 preferably incorporates members that are connected in the illustrated space frame that are each formed by aluminum rectangular tubing. Frame 36 is provided with a front member 50 that is shaped into an inverted "U"-like configuration. Support for the panels forming the side portions 32 and 34 is provided by top members 54 that are angled upwardly with respect to bottom members 52 that are in turn connected, at opposite ends, to the front member 50 and rear members 56. Intermediate members 58 are connected at opposite ends to front member 50 and rear members 56. The panel forming the wedge-like roof section 38 is framed by two parallel members 60 and 62 that are connected to the front member 50. An end member 64 and an intermediate member 66 are connected at opposite ends to the two parallel members 60 and 62. The panels forming the transition sections 42 and 40 are supported by side members 54, top members 60 and 62, and front member 50 Further structural integrity is provided for the wedge-like roof section 38 by vertical members 72 that are connected at their top ends to intermediate member 66 and at the bottom by bottom cross-members 74 and 76. Further structural integrity is provided by angled structural members 68 and 70, connecting the wedge-like roof section structure to side members 54. Further strength is provided by pairs of intermediate cross members 78 and 80 that are connected at opposite ends to vertical members 72 and intermediate members 58. Brace-like members 82 are connected at opposite ends to bottom cross-members 74 and 76 and bottom members 52 and intermediate brace-like members 84 are connected to intermediate members 58 and intermediate cross members 78 and 80. A GPS support tray 86 is situated beneath window 46 to support the GPS antenna 20. Support tray 86 is in turn connected to front member 50 and intermediate member 66.

As could be appreciated by those skilled in the art, the construction employed in fabricating the fairing body 28 and its frame 36 are conventional. For instance, the members, discussed above and making up the frame 36 can be attached by welding. The panels covering the frame 36 and forming the top portion 30 and the side portions 32 and 34 can be attached to the frame 36 by such means as pop rivets. Other possible fastening means include adhesive bonding, polymeric welding by heat or solvent, threaded fasteners, hook-and-loop fasteners and interlocking configurations.

Figure 7:
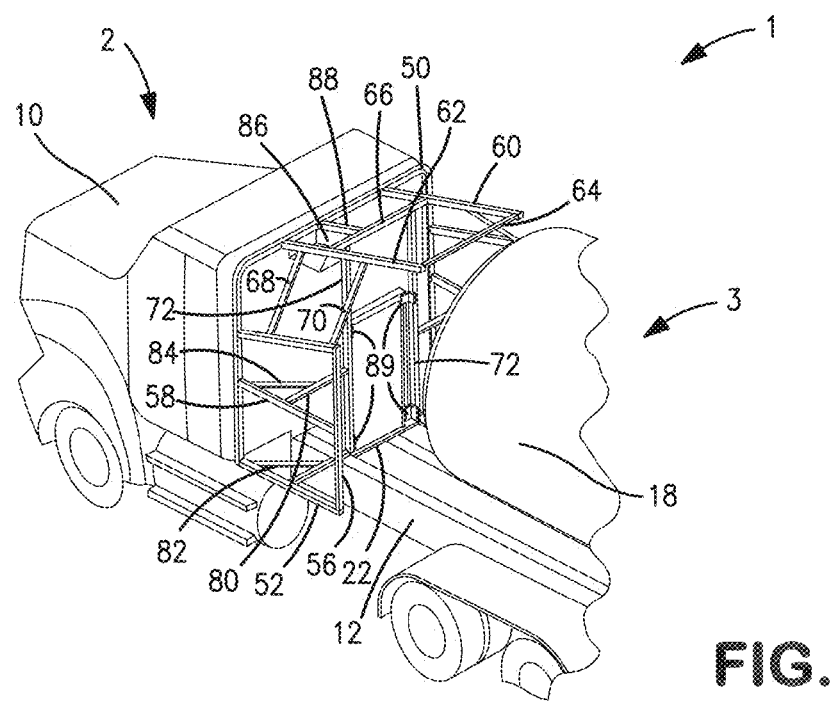
FIG. 7 is a fragmentary, perspective view of the frame shown in FIG. 6 with portions broken away to illustrate a method of attachment of the fairing body of the present invention to a chassis of a tractor.

The fairing body 28 is attached to the chassis 12 by attaching the frame 36 to the chassis 12 by such means as welding, clamping, bolting, pinning or other structurally adequate attachment means. As illustrated, in FIG. 7, such attachment to the chassis is effectuated by means of angle-like brackets 89 that are bolted to vertical members 72 and to the rear portion or frame of the auxiliary hydraulic unit 22 which is in turn connected to the chassis 22. In this fashion, the gap fairing 26 is able to be incorporated into an OEM tractor manufacturer's cab shape and other design features. It is possible to attach frame 36 to the chassis 12 using brackets. These brackets can be structurally shaped plate material clamping the frame 36 to the chassis 12 or other pre-existing structural features on the tractor.

Figure 8:
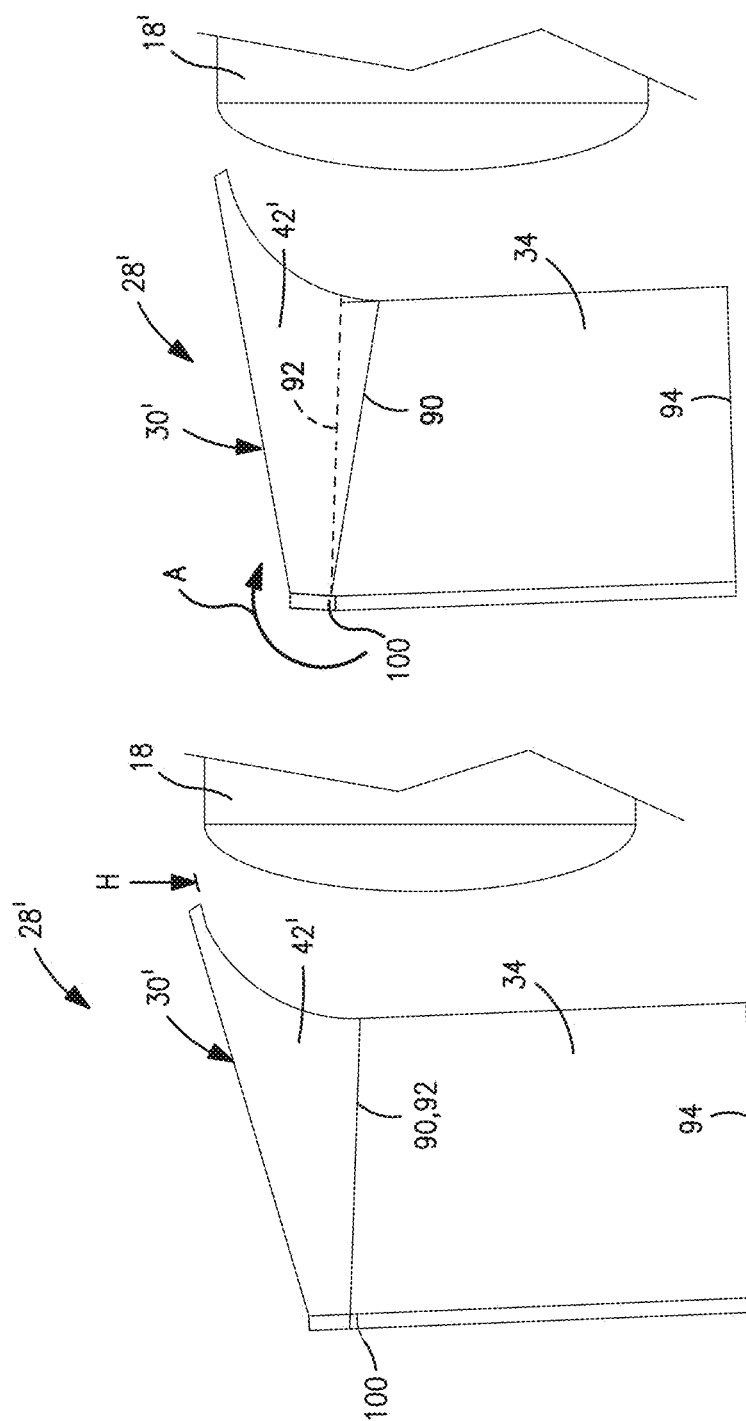
FIGS. 8A and 8B illustrate an alternative embodiment of a fairing body of the present invention that incorporates a top portion that can be pivoted.

With reference to FIGS. 8A and 8B, a fairing body 28' is illustrated that incorporates a top portion 30' and other structural modifications to the frame 36, discussed above, that is designed to allow a degree of adjustment in the fairing body 28' to enable use of such fairing body with trailers and therefore, tanks 18' of differing height relative to the chassis 12 or size. To such end, the top portion 30' is capable of pivoting motion and is provided with modified transition sections such as 42' that compared to transition section 42 discussed above has a greater height "H". The transition section opposite to transition section 42' incorporates a similar modification to the transition section 40 discussed above. Both of such modified transition sections are also wider than the transition sections 42 and 40 and are provided with a lower edge 90. The side portions, such as the side portion 34' are identical to the side portion 34 or side portion 32 for that matter and the top edge 92 thereof is at the same spacing from the bottom edge 94. This being said, for reasons that will become apparent the spacing between top and bottom edges 92 and 94 could incorporate a different spacing from those of side portions 32 and 34. With reference to FIG. 8A, the top portion 30' is at its uppermost position level with the tank 18. However, where a tank 18' is used that is at a lower height than tank 18 the top portion 30' can be pivoted to accommodate such height. With reference to FIG. 8B, in order to accommodate this lower height, the top portion 30' is pivoted downwardly in the direction "A" and the lower edge 90 of the transition section 42' can be seen to be below the top edge 92 of the side portion 34' which is now enclosed by the transition section 42' due to the overlap.

Figure 9:
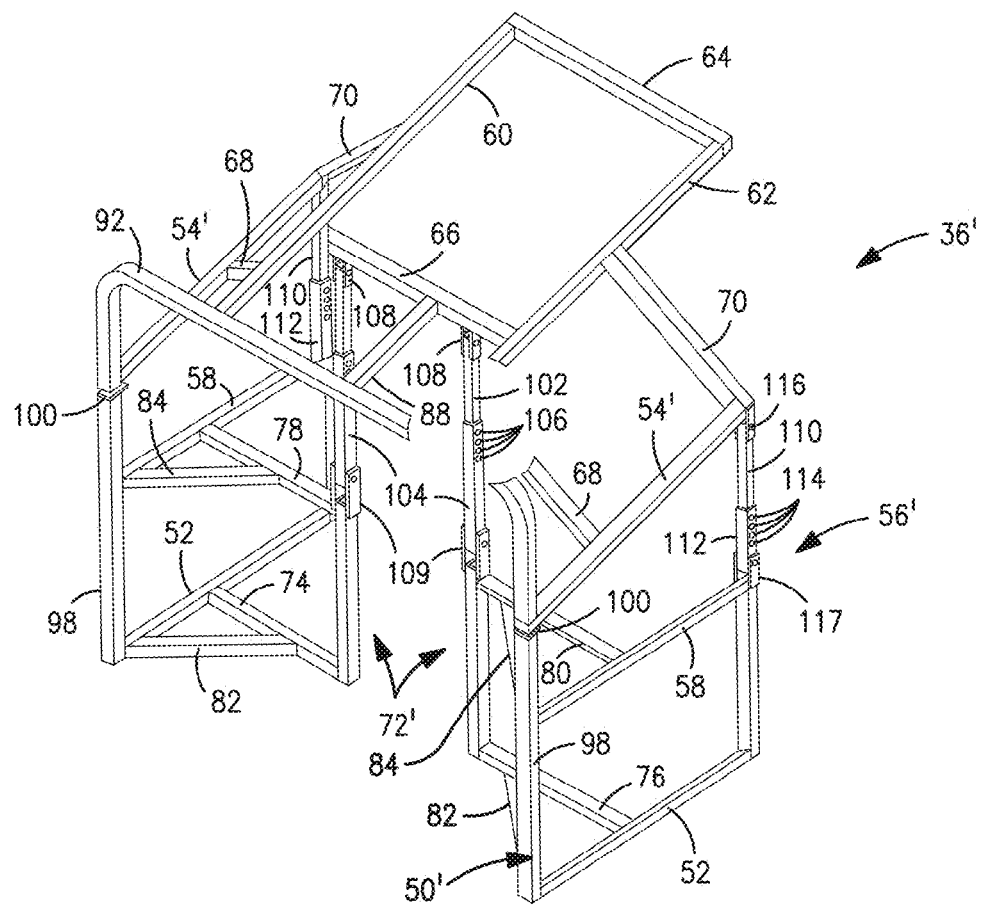
FIG. 9 is an enlarged perspective view of an alternative embodiment of the frame for with portions broken away.

With additional reference to FIG. 9, a modified version of the frame 36 is illustrated as frame 36' to enable the pivoting motion of the top portion 30'. One such modification is to the front member 50 described above by providing a front member 50' that is split at the legs of its "U" like configuration to form an upper "U" like portion 96 and two lower leg portions 98 which are connected by means of a hinge 100. The upper member 54' of the modified frame, that would be coincident with the lower edge 90 of the transition section 42', is connected, at one end to the resulting upper "U" like portion 96 of the front member 50'. Upper member 54' would in other respects be identical to the upper member 54 described above. This hinge 100 allows for the pivoting motion of the modified top portion 30'. In order to allow such motion while still providing support, frame 36' is also provided of vertical members 72' that are a modification of the vertical members 72, discussed above. Vertical members 72' are telescopic and are provided with a top section 102 telescoped within a bottom section 104. The top and bottom sections 102 and 104 are also provided with a series of holes 106 through which a bolt or pin can be positioned to lock the top and bottom sections 102 and 104 in place. The top section 102 is connected to the intermediate member 66 by a pivotable connection 108. The bottom section 104 is connected to the lower portion of vertical members 72' by means of a pivotable connection 109. Additionally, a further modification incorporated into the frame 36' is to similarly split rear member 56', above intermediate member 58 into a top section 110 telescoped within a bottom section 112. Top and bottom sections 110 and 112 are provided with a series of holes 114 through which a bolt or pin can be extended to lock the sections in place. Top Section 112 is connected to end member 70 by a pivotable connection 116. The bottom section 112 is connected to the remainder of split rear member 56' by means of a pivotable connection 117. The frame 36' is otherwise similar to frame 36.

Figure 10:
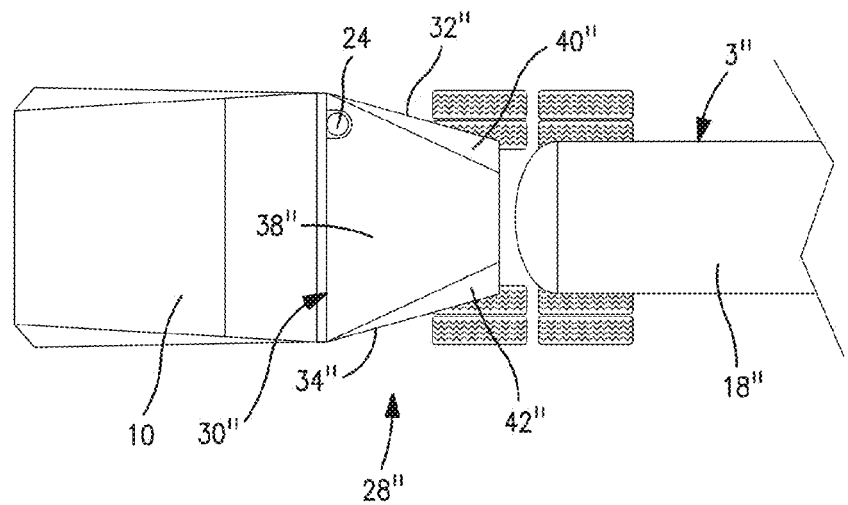
FIG. 10, is a fragmentary top plan view of an alternative embodiment of a fairing body in accordance with the present invention that is installed on the tractor-trailer shown in FIGS. 2 and 3.
Figure 11:
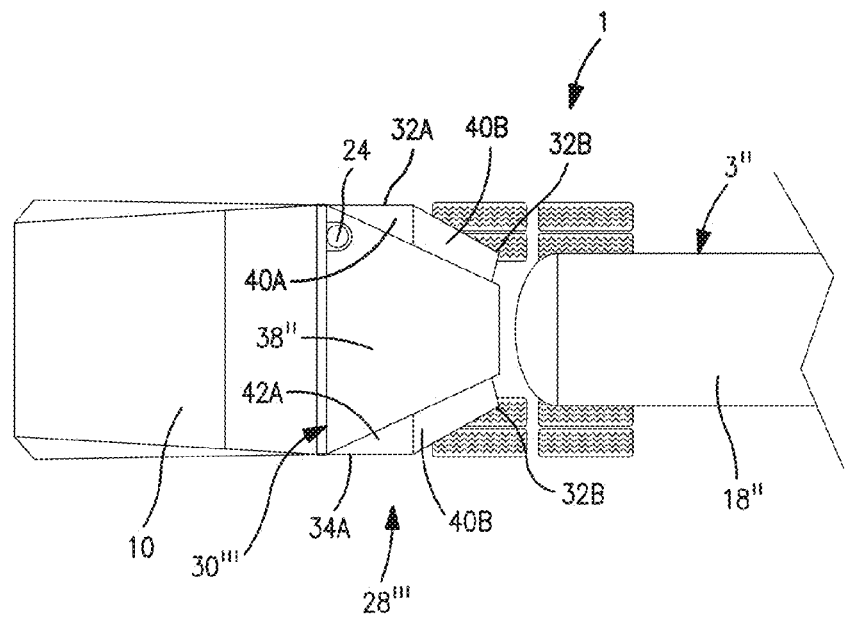
FIG. 11, is a fragmentary top plan view of a further alternative embodiment of a fairing body in accordance with the present invention that is installed on the tractor-trailer shown in FIGS. 2 and 3.

A yet further modification to a fairing body in accordance with the present invention is shown in FIG. 10 in which a fairing body 28" is provided in which modified side portions 32" and 34" are provided that converge towards a tank 18" of smaller diameter than the tank 18 discussed above and mounted on a trailer 3". The top portion 30" is also modified with a tapered wedge-like roof section 38" and modified transition sections 40" and 42" that are narrower than the transition sections 40 and 42 and that extend downwardly from tapered wedge-like roof section 38" to the side portions 32" and 34". A yet further modification to the fairing body is shown in FIG. 11 to accommodate the smaller diameter tank 18" in which a fairing body 28'" is provided with side portions that have two substantially parallel side sections 32A and 34A and two converging end sections 32B and 34B that converge toward the tank 18". The top portion 30'" is modified by providing a set of two transition sections 40A and 420A that extend from the wedge-like roof section 38" (of the same design as that used in the embodiment shown in FIG. 10) toward the substantially parallel side sections 32A and 34A and another set of two transition sections 40B and 420B that extend toward the converging end sections 32B and 34B, respectively. As could be appreciated, the frame supporting such fairing bodies 28" and 28'" would be a modification of the frame 36, discussed above, in a manner known in the art.

Figure 12:
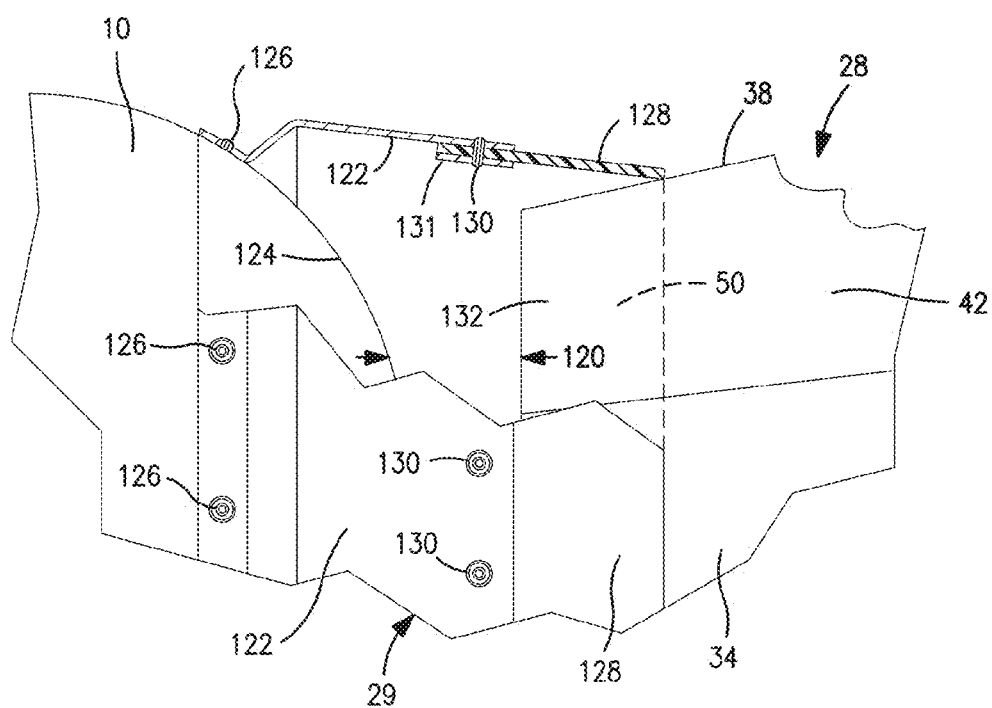
FIG. 12 is an enlarged fragmentary view of a sealing element used in connection with the gap fairing shown in FIGS. 2 and 3 with portions broken away to show a cross-section thereof.

As mentioned above, the independent mounting of the fairing body 28 to the chassis 12 rather than the cab 10 is important in that the cab is mounted by a suspension that will isolate the cab 10 from vibration. This leaves a slight separation space 120 between the rear of the cab 10 and the front of the fairing body 28. The seal element 29 has been found by the inventors herein not only to reduce drag as a result of the separation space 120, but also, to reduce noise due to air turbulence that would otherwise be induced by such separation space 120. In order to prevent the transmission of relative motion between the cap 10 and the fairing body 28, the seal element 29 is at least in part flexible or resilient or both flexible and resilient so that such seal element 29 will fill in or cover the separation space 120 but will not transmit forces due to the relative motion. With reference to FIG. 12, seal element 29 is designed to cover the separation space 120 and includes a rigid strip-like element 122, formed of metal or a stiff composite, which extends around a rear peripheral portion 124 of the cab 10. The rigid strip-like element 122 is attached by rivets 126 or other suitable attachment means to the cab 10 such that the rigid strip-like element 122 extends from the cab 10 towards the fairing body 28. The resilient or flexible part of the seal element 29 is provided by a flexible strip-like element 128 that is attached to the rigid strip-like element 122 also by rivets 130 that pass through the rigid strip-like element 122 and the flexible strip-like element 128 and are anchored in place by individual anchoring plates 131. The flexible strip-like element 128 simply rests upon or overlaps the front periphery 132 of the fairing body 28. As illustrated, the cab 10 is slightly higher than the front portion 132 of the fairing body 28 that is situated at the front member 50. The overlap of the flexible strip-like element 128 of the gap seal element accommodates a variable space between the cab 10 and the fairing body 28, allowing less precise positioning of the fairing body 28 on the tractor chassis 12.

Figure 13:
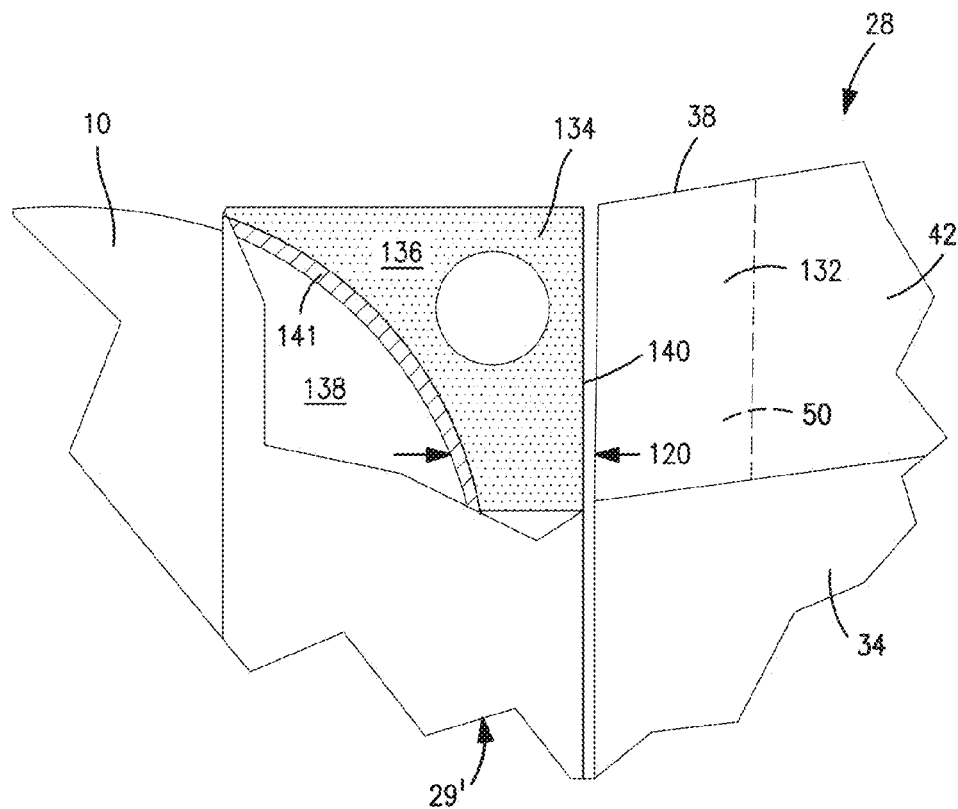
FIG. 13 is an enlarged fragmentary view of an alternative embodiment of a sealing element in accordance an aspect of the present invention with portions broken away to show a cross-section thereof.

With reference to FIG. 13, an alternative embodiment of the seal element 29 is illustrated as seal element 29'. Seal element 29' is itself a resilient element in the form of a cushion-like element 134 that is located within the separation space 120 and is configured to extend around a rear peripheral portion of the cab 10 and a front portion of the fairing body. In this regard, the cushion-like element 134 has a front surface 136 that is shaped to conform with the rear peripheral portion 138 of the cab 10 and which as illustrated incorporates a slight curvature. An opposite surface 140 of the cushion-like element 134 is shaped to conform to and contact the front portion 132 of the fairing body 28. The cushion-like member can be formed by an elastomer that may be a molded, extruded, or otherwise solid, cellular, foamed, foamed with a solid skin, or hollow fitted section. The cushion-like element 134 can be attached to the rear peripheral portion of the cab 10 by means of a layer of glue or adhesive 141. The cushion-like element 134 may be a molded, extruded, or otherwise a solid, cellular, foamed, foamed with a solid skin, or hollow fitted section. Although not illustrated, the cushion-like element 134 can be attached to the fairing body 28.

Figure 14:
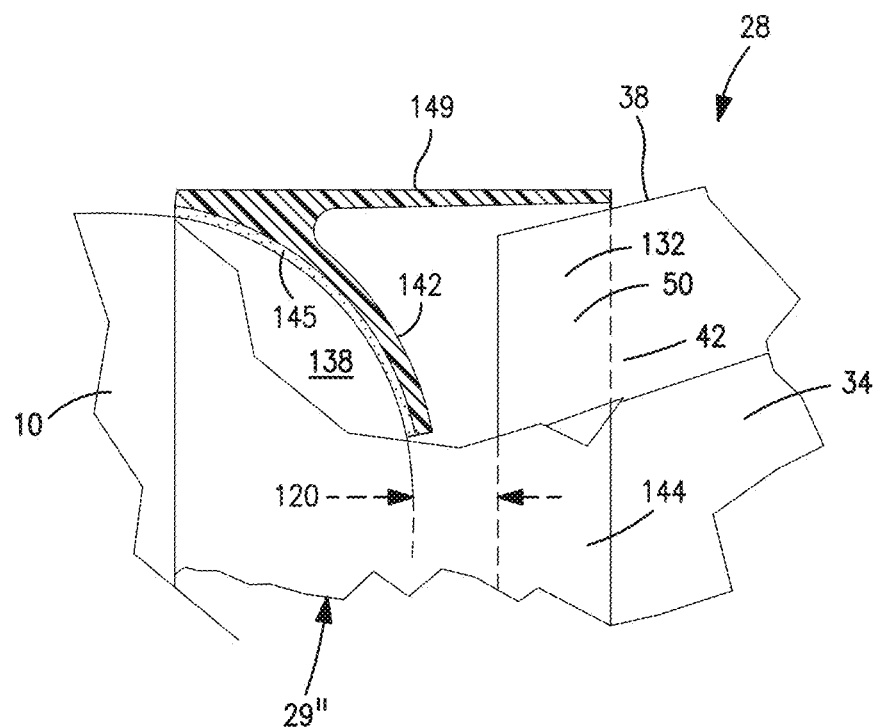
FIG. 14 is an enlarged fragmentary view of a further alternative embodiment of a sealing element in accordance an aspect of the present invention with portions broken away to show a cross-section thereof.

With reference to FIG. 14, a yet further alternative embodiment of the sealing element is illustrated an designated by reference number 29". Sealing element 29" is preferably a rubber extrusion or other extruded material that is both flexible and resilient. As illustrated, it has a "V"-like transverse cross-section having two leg-like sections 142 and 144. Leg-like section 142 is attached to a rear of the peripheral portions of the cab 10 at the peripheral surface 138 thereof by a layer of glue or adhesive 145. Given the flexibility of the leg section 142, it conforms to such peripheral surface 138. The other leg-like section 144 rests upon a front of the peripheral portions of the fairing body 28 situated at the front portion 132 thereof and covering the separation space 120 and enclosing the leg section 142.

With additional reference to FIG. 15, in any embodiment of the present invention a clear panel 150 can be provided within the side portion 32 situated on the passenger side of the tractor as viewed with the gap fairing 4 is installed. It is to be noted that the term, "passenger side" means the side of the tractor that is opposite to which the driver sits and operates the tractor. For instance, in those countries in which traffic proceeds along the right side of a highway, as viewed by the driver, the driver will sit on the left side of the vehicle and the passenger side will be located right side, also as viewed by the driver. The reverse would be the case in other countries in which traffic proceeds along the left side of the highway. The clear panel 150 is positioned to enable the driver to view the trailer 3 from the rear windows 152 and 154 thereof when the trailer 3 is angled towards the passenger side. As can be appreciated, when the trailer is angled towards the driver side, the driver can position him or herself partially out the side window of the tractor 2 to view the trailer 3. However, if the side portion of the fairing 4 were not provided with the clear panel 150, forming at least a section of the side portion 34 of the fairing 4, while the driver would be able to see the trailer 3 out of the side view mirror 156, the driver would not be able to see the exact position of the trailer 3. This ability to inspect the position of the trailer 3, is particularly advantageous in driving operations in which the tractor trailer 1 is being backed up around a curve or into a loading area.

As can be appreciated, the other side portion 34 could be provided with the clear panel 150 for the sake of consistency. Also, the entire side portion 32 and, optionally side portion 34, could be made of a clear material as indicated above. Lastly, although the use of the clear panel 150 is particularly advantageous in a gap fairing, such as gap fairing 4 in accordance with the present invention that is attached solely to the chassis of the tractor and independent of the cab 10, the use of such a clear panel or the like could be used in connection with any gap fairing, even a fairing of the prior art that is attached to a cab of a tractor trailer and overlies the roof of the cap or one that is a gap fairing but does not incorporate an upwardly sloping top portion.

With reference to FIGS. 16 and 17, the embodiments of the present invention include impact absorbing extensions 170 extending rearwardly from the side portions 32, 34. These impact absorbing extensions 170 are configured to protect the fairing body 28 from any impact by the trailer during maneuvering of the tractor-trailer.

The impact absorbing extensions 170 may be separately attached to the distal end of the side portions 32, 34 on each side of the tractor-trailer or can be manufactured as an integrated section of the side portions 32, 34 of the fairing body 30. The impact absorbing extensions 170 are preferably constructed of flexible, compressible or resilient type materials to provide a cushion-like barrier between the fairing body 30 and the sides of the trailer during maneuvering of the tractor-trailer.

FIGS. 18 and 19 depict alternate embodiments of the present invention with the impact absorbing extensions 170 extending rearwardly from the side portions 32, 34. In these embodiments, the impact absorbing extensions 170 are moveable structures that protect the fairing body 28 from any impact by the trailer during maneuvering of the tractor-trailer. In FIG. 18, the impact absorbing extensions 170 retract into the fairing body 28 when impacted thereby absorbing the force of the impact without damage to the fairing body 28. In FIG. 19, the impact absorbing extensions 170 are connected to the distal end of the side portions 32, 34 of the fairing body 30 with hinges that allow the impact absorbing extensions 170 to rotate when impacted by the trailer thereby preventing structural damage to the fairing body 28.

In the illustrated embodiments, the impact absorbing extensions 170 are preferably constructed of an elastomeric material disposed along the entire distal end of the side portions 32, 34 of the fairing body 30. The dimensions of the impact absorbing extensions 170 are selected to provide additional drag reduction benefits and airflow streamlining benefits associated with of the gap fairing while preventing any impact between the trailer and the fairing body during articulating maneuvers of the tractor-trailer.

While particular embodiments have been described and or illustrated, such are not intended to be limiting. Modifications and changes may become apparent to those skilled in the art, and it is intended that the invention be limited only by the scope of the appended claims.

We claim:

1. A gap fairing for reducing aerodynamic drag of a tractor-trailer having a tractor and a trailer pivotably connected to the tractor, said gap fairing comprising:
   a fairing body attached to a chassis of the tractor within a gap between a cab of the tractor and the trailer of said tractor-trailer and configured to enable the trailer to pivot during maneuvering of the tractor-trailer, the fairing body having a front portion situated directly behind the cab, side-portions connected to the front portion and extending rearwardly toward the trailer, and a top portion extending to the side portions; and
   one or more impact absorbing extensions extending rearwardly from fairing body and configured to protect the fairing body and the trailer from any impact between the fairing body and the trailer during maneuvering of the tractor-trailer;
   wherein the impact absorbing extensions and the side portions are configured to inhibit cross-winds from entering the gap and streamline air flow from sides of the cab to the trailer.

2. The gap fairing of claim 1 wherein a separation space exists between the front portion of the fairing body and the cab.

3. The gap fairing of claim 1 wherein the impact absorbing extension is a flexible, compressible or resilient type material that provides a barrier between the side portion of the fairing body and the trailer.

4. The gap fairing of claim 1 wherein the impact absorbing extension is formed of an elastomeric material.

5. The gap fairing of claim 1 wherein the impact absorbing extension is a moveable structure that retracts into the side portion upon impact from the trailer while providing a physical barrier between the side portion of the fairing body and the trailer.

6. The gap fairing of claim 1 wherein the impact absorbing extension is hinged to the side portion of the fairing body and is configured to rotate upon impact from the trailer while providing a physical barrier between the side portion of the fairing body and the trailer.

7. The gap fairing of claim 1 wherein the top portion is connected to at least the front portion and extends to the side portions, and wherein the top portion extends from the front portion of the fairing body and terminates in a trailing end located behind the side portions.

8. The gap fairing of claim 1 further comprising at least one clear section on at least one of the side portions and positioned to enable a person in the cab to view the trailer from a rear window of the cab when the trailer is angled.

9. The gap fairing of claim 8 wherein the at least one clear section is located on a passenger side of the tractor.

10. The gap fairing of claim 1 further comprising a seal element configured to seal the separation space between said cab and the fairing body at outer peripheral portions thereof and at least in part having at least one of a resiliency and a flexibility so as to allow relative motion between said fairing body and said cab.

11. The gap fairing of claim 1 wherein the side portions are parallel to one another.

12. The gap fairing of claim 1 wherein at least part of the side portions converge toward one another or diverge away from one another.

13. An impact absorbing member for a tractor-trailer combination comprising:
 a panel structure moveably or fixedly coupled to a fairing body or a cab of the tractor-trailer combination, the panel structure having a leading edge disposed proximate to the fairing body or the cab of the tractor-trailer combination and a trailing edge extending readwardly from the fairing body or the cab towards a trailer;
 wherein the impact absorbing member is configured to provide a barrier between the fairing body or the cab and the trailer during maneuvering of the tractor-trailer; and
 wherein the impact absorbing member is further configured to assist in inhibiting cross-winds from entering the gap between the tractor and the trailer and streamline air flow from the tractor to the trailer.

14. The impact absorbing member of claim 13 wherein the trailing edge of the panel structure is a flexible, compressible or resilient type material that prevents direct impact between the fairing body or the cab and the trailer.

15. The impact absorbing member of claim 14 wherein the panel structure is fixedly coupled to the fairing body or the cab of the tractor-trailer combination.

16. The impact absorbing member of claim 13 wherein all or a portion of the trailing edge of the impact absorbing member is formed of an elastomeric material.

17. The impact absorbing member of claim 13 wherein the panel structure is moveably coupled to the fairing body or the cab of the tractor-trailer combination and the panel structure retracts towards the cab upon impact with the trailer.

18. The impact absorbing member of claim 13 wherein the panel structure is moveably coupled to the fairing body or the cab of the tractor-trailer combination and the panel structure is hinged to the fairing body or the cab and is configured to rotate towards the cab upon impact with the trailer.

\* \* \* \* \*